United States Patent Office 2,860,158
Patented Nov. 11, 1958

2,860,158
COMPOUNDS OF THE PERHYDROCHRYSENE SERIES AND PREPARATION THEREOF

Raymond O. Clinton, North Greenbush Township, Rensselaer County, N. Y., assignor to Sterling Drug Inc., New York, N. Y., a corporation of Delaware No Drawing. Application October 18, 1954
Serial No. 463,055

16 Claims. (Cl. 260—488)

This invention relates to new compounds of the perhydrochrysene series (D-homosteroids) and to processes for their preparation. More particularly the invention relates to compounds having the formula

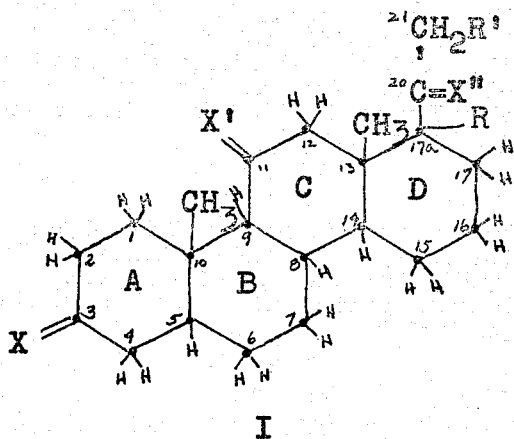

I wherein $X=$, $X'=$ and $X''=$ are selected from the class consisting of

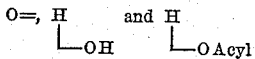

R is selected from the class consisting of H, OH and OAcyl; and R' is selected from the class consisting of H, OH, OAcyl and halogen. The invention also contemplates compounds corresponding to the above structure I having a double bond in the 17,17a-position formed by elimination of RH; likewise the compounds having a halogen atom in the 4-position, X being O.

The compounds of the above formula I wherein $X=$ is $O=$, R' is OH or OAcyl and a double bond is present in the 4,5-position possess cortical hormone-like activity, and the compounds within the scope of Formula I are intermediates for the preparation of said compounds having cortical hormone-like activity. Some of said intermediates also possess biological activity per se, for example, as antagonists of progesterone or testosterone. Methods for the preparation of said intermediates and conversion of the latter into the biologically active compounds are described hereinbelow.

In the above general Formula I, the groups X, X' and X'' can be the same or different, and R and R' can be the same or different.

In compounds of Formula I where OAcyl groups are present, the nature of such acyl groups is not critical as they are used only as a blocking or protecting means for the hydroxy groups. The preferred types of acyl groups are those derived from carboxylic acids of relatively low molecular weight, i. e., containing from one to about eight carbon atoms, including inter alia lower-alkanoic acids, lower-aliphatic dicarboxylic acids, and monocyclic aromatic carboxylic acids optionally substituted by one or more inert groups such as nitro, alkyl, alkoxy and halogen groups. Thus "Acyl" can be lower-alkanoyl, such as formyl [HCO—], acetyl [$CH_3CO$—], propionyl [$C_2H_5CO$—], butyryl [$CH_3(CH_2)_2CO$—], isobutyryl [$(CH_3)_2CHCO$—], valeryl [$CH_3(CH_2)_3CO$—], caproyl [$CH_3(CH_2)_4CO$—], octanoyl [$CH_3(CH_2)_6CO$—] and the like; carboxy-lower-alkanoyl, such as succinyl [$HOOCCH_2CH_2CO$—], glutaryl [$HOOC(CH_2)_3CO$—], adipyl [$HOOC(CH_2)_4CO$—] and the like; and monocarbocyclic aroyl, such as benzoyl [$C_6H_5CO$—], p-toluyl [p-$CH_3C_6H_4CO$—], p-nitrobenzoyl [p-$O_2NC_6H_4CO$—] and the like.

When the group R' in Formula I stands for halogen it can be any one of three halogens, chlorine, bromine and iodine. Bromine is a preferred halogen.

In compounds wherein ring D is saturated, the group R at the 17a-position can be in either the α- or β-configuration, the side chain $R'CH_2C(=X'')$— then assuming either the β- or α-configuration, respectively. Acyloxy or hydroxy groups in the 3- and 11-positions can also be in either the α- or β-configuration.

The compounds of the invention are prepared by a series of transformations as outlined in the following flow sheet. In the formulas, $X=$, $X'=$ and R have the same meanings as given above. R'' stands for either a hydrogen atom or an acyl group, and Hal stands for halogen.

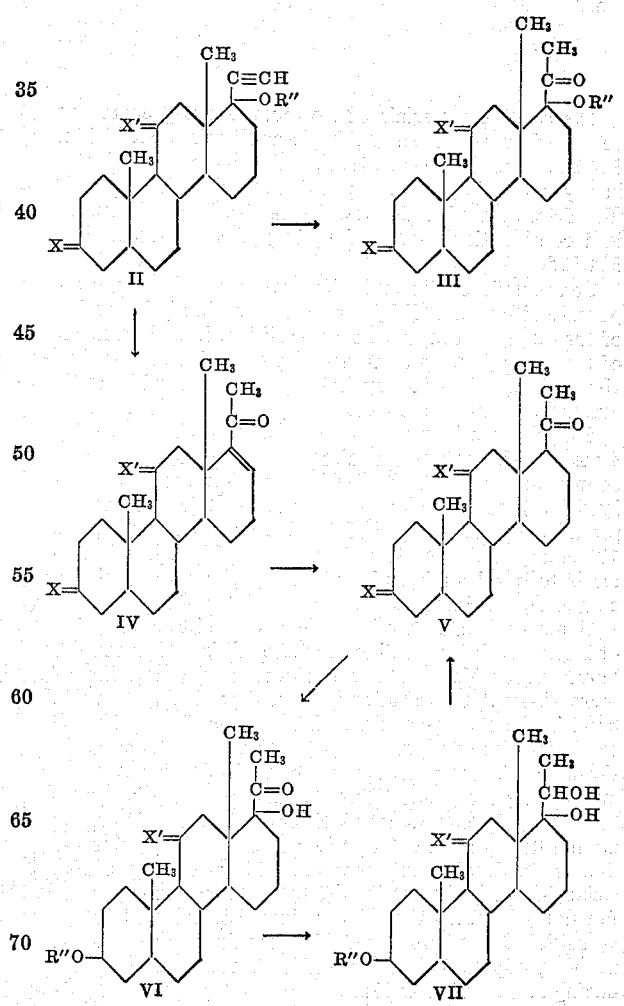

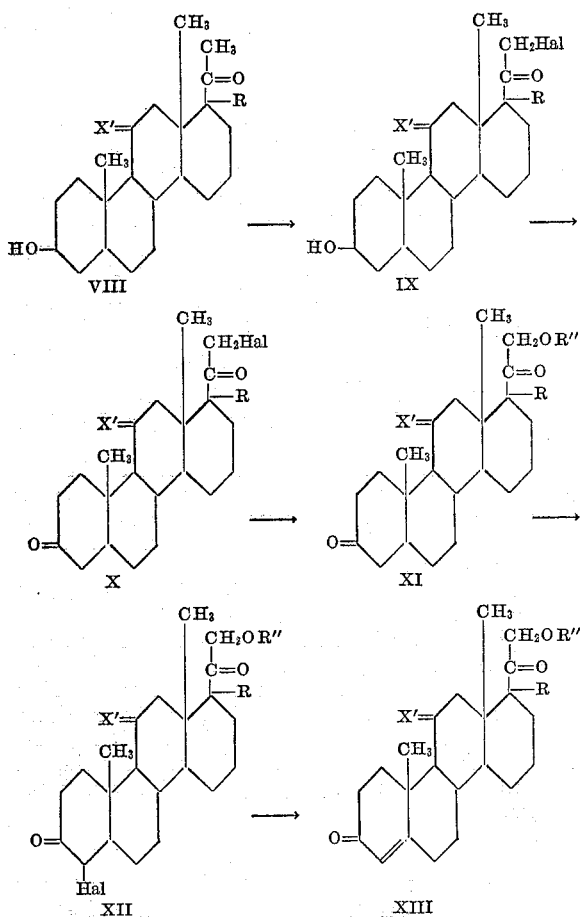

The starting materials of Formula II are prepared as described in my copending U. S. application, Serial No. 384,325, filed October 5, 1953, and now abandoned, and in my copending U. S. application, Serial No. 475,810, filed December 16, 1954, now Patent No. 2,822,382, which is a continuation-in-part of said application, Serial No. 384,325.

Compounds of Formula III are prepared from compounds of Formula II by reactions resulting in hydration of the ethynyl group at the 17a-position, i. e., conversion of the ethynyl group to an acetyl group. The conversion II→III is carried out by heating II either with acetic anhydride, mercuric ion and boron trifluoride followed by hydrolysis, or with aniline, mercuric ion and water. The same transformation can also be effected by treating a compound of Formula II with an N-bromo amide or imide such as N-bromoacetamide under conditions which produce hypobromous acid in situ, thus converting the 17a-ethinyl group to a 17a-dibromoacetyl group. The latter is then debrominated by heating with zinc to give a compound of Formula III.

Compounds of Formula II are converted to compounds of Formula IV by reacting II where R" is hydrogen with boron trifluoride in ethylene glycol in the presence of mercuric ion. Dehydration is effected producing a double bond in the 17,17a-position. Compounds IV can then be catalytically hydrogenated to produce a compound of Formula V, analogous to compounds of Formula III but lacking the 17-OR" group. In the catalytic hydrogenation of compounds of Formula IV, the hydrogen atom entering at the 17a-position preferentially takes the α-position, leaving the acetyl group in the β-position. Accordingly, it is possible to convert a compound of Formula II where the ethynyl group is oriented in the α-position to a compound of Formula V wherein the acetyl group is in the β-position, thus, in effect, producing an inversion at 17a.

The compounds of Formula V where X is

can be converted to compounds of Formula VI by formation of the 20-enol acylate by heating with an acid anhydride in the presence of a strong acid, reacting the resulting 17a(20)-unsaturated compound with a peroxidic compound such as hydrogen peroxide or a peracid, e. g. peracetic or perbenzoic acid to give the corresponding 17a(20)-oxide of the 20-enol acylate, and finally saponifying the latter with a base which hydrolyzes the oxide ring to give a 17aα-hydroxy group in a compound of Formula VI.

The compounds of Formula VI are a subgroup of compounds of Formula III where X is

In these compounds the 20-keto group can be reduced to a 20-hydroxy group by means of alkali metals or alkali metal derivatives to give a compound of Formula VII. Such reducing agents include lithium, sodium or potassium in lower-alkanols or ammonia, alkali metal hydrides, alkali metal borohydrides and alkali metal aluminum hydrides. Catalytic hydrogenation can also be employed if desired. If an 11-keto group is present in the compounds of Formula VI (X' is O) it will also be reduced to an 11-hydroxy group

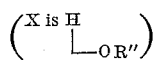

by the above-named reagents, although the 20-keto group can be selectively reduced by mild treatment with sodium borohydride without affecting the 11-keto group.

The compounds of Formula VII can be converted to compounds of Formula V

by heating VII, preferably in the form of its 20-acylate, with zinc dust. Elimination of the elements of water or carboxylic acid occurs, the 17-hydroxy group is lost, and the 20-keto compound V is produced. In the course of the reaction the stereochemical orientation of the side chain at 17a is inverted. For example, if the CH₃CH(OH)— group at 17a in compound VII is in the α-configuration, it will be converted to compound V with the CH₃CO— group in the β-configuration, and vice versa.

Compounds of Formula VIII, corresponding to III or V where X is $$\overset{H}{\underset{OH}{|}}$$

can be halogenated in the 21-position to give compounds of Formula IX. This is accomplished by reacting the compound VIII with a halogen selected from chlorine, bromine and iodine or with a compound which acts as a source of one of these halogens. Bromination is generally preferred and can be carried out by contacting the compound VIII with elementary bromine in an inert solvent such as chloroform or acetic acid, or with compounds containing available positive bromine, such as pyridinium bromide perbromide. Iodination can be accomplished by reacting the 20-keto compound with iodine and an epoxide according to Buck and Clinton U. S. Pat. 2,678,932. Chlorination can be accomplished by reacting the 20-keto compound with sulfuryl chloride according to Johnson and Clinton U. S. Pat. 2,686,188. In compounds of Formula VIII where X' is O, the 21-position only is halogenated, because the positions adjacent to an 11-keto group (positions 9 and 12) are relatively unreactive.

The hydroxyl function in the 3-position of a compound of Formula IX is then oxidized to a keto group by the action of oxidizing agents such as chromic oxide, N- bromoacetamide or an aluminum alkoxide (Oppenauer method) thus producing a compound of Formula X. In compounds where X' is

the 11-hydroxy group can also be oxidized to an 11-keto group (X'=O), however the 11-hydroxy group is less readily attacked than the 3-hydroxy group, and the latter can be oxidized selectively under controlled conditions without affecting the 11-hydroxy group.

The compounds of Formula X can then be reacted with an alkali metal acylate to replace the 21-bromine by an acyloxy group, forming compounds of Formula XI. The over-all conversion of IX to XI need not take place in the order given; the replacement of the 21-bromine by acyloxy may precede the oxidation of the 3-hydroxy group if desired.

The introduction of a double bond in the 4,5-position is effected by halogenation of a compound of Formula XI in the 4-position by procedures analogous to those described above for halogenation in the 21-position, followed by dehydrohalogenation of a compound of Formula XII thus formed to give an unsaturated ketone of Formula XIII. The dehydrohalogenation is brought about by heating the 4-halo compound with a basic substance, e. g., an amine, hydrazine or a substituted hydrazine, or with certain non-basic dehydrohalogenating agents such as anhydrous lithium chloride.

It is, of course, possible to oxidize the 3-hydroxy group of a compound of Formula VIII, halogenate at the 4-position and dehydrohalogenate to produce a compound analogous to structure XIII but having hydrogen in place of the OR" group in the 21-position.

Hydroxy or keto groups at positions 3 and 11 can be readily interconverted by conventional methods known to oxidize cycloaliphatic hydroxy groups to keto groups, e. g., with hexavalent chromium, N-bromoamides, aluminum alkoxides (Oppenauer method), etc.; or to reduce cycloaliphatic keto groups to hydroxy groups, e. g., with lithium aluminum hydride, sodium borohydride, the Meerwein-Pondorff method, etc. Selective conversion can often be effected by taking advantage of the different reactivities of groups in the 3-, 11- and 20-positions, or by protecting one group by means of acylation in the case of hydroxy groups or ketal formation in the case of keto groups.

Hydroxy groups present in the molecule can be readily acylated to prepare any desired ester by reacting the free hydroxy compound with an acid, acid anhydride or acid halide according to conventional procedures.

The following examples will further illustrate the invention, but the latter is not restricted thereto.

*Example 1*

3α - acetoxy - D - homopregnan - 17aβ - ol - 11,20-dione [III; X is

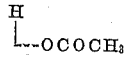

X' is O, R" is H].—17aα-ethynyl-D-homoetiocholane-3α,17aβ-diol-11-one, M. P. 220.5–228° C. (II; X is OH, X' is O, R" is H) (5.0 g.), and 2.5 g. of mercuric oxide were dissolved in 100 ml. of glacial acetic acid by warming. The solution was cooled to 10° C., 30 ml. of 90–95% acetic anhydride was added, followed by 2 ml. of 47% boron trifluoride-ether complex. The reaction mixture was kept at room temperature (33–34° C.) for about twenty-four hours, and then added to 300 ml. of cracked ice. The mixture was made basic with 35% sodium hydroxide solution. The solid material was collected by filtration, washed with water and dried at 50° C. The total solid product was refluxed with 15 g. of potassium carbonate in 400 ml. of methanol and 40 ml. of water for one and one-half hours. The insoluble inorganic matter was removed by filtration, the filtrate concentrated to a small volume, diluted with water, and the solid material which separated was collected by filtration, washed and dried, giving 5.0 g. of crude D-homopregnane-3α,17aβ-diol-11,20-dione, M. P. 120–137° C. The latter was mixed with 40 ml. of 90–95% acetic anhydride and 20 ml. of pyridine and the mixture was heated for one hour on a steam bath. The mixture was then added to ice-water, allowed to stand until the excess acetic anhydride had been hydrolyzed, and the acetylated product was extracted with methylene dichloride. The methylene dichloride extracts were washed with dilute hydrochloric acid and dilute sodium carbonate solution, dried over anhydrous sodium sulfate and concentrated. The residue was dissolved in 80 ml. of ether, the solution diluted to 800 ml. with petroleum ether (Skellysolve A), and the resulting solution was chromatographed on a column of 200 g. of chromatographic grade silicon dioxide. The column was eluted with ether-petroleum ether (Skellysolve A) mixtures of gradually increasing ether content; 50% ether brought out crystalline material which was collected and recrystallized from an ethyl acetate-petroleum ether (Skellysolve C) mixture, and dried at 70° C., giving 1.5 g. of 3α-acetoxy-D-homopregnan-17aβ-ol-11,20-dione, M. P. 189–193° C. A sample when recrystallized twice from a small volume of methanol and dried at 110° C. in vacuo for eight hours had the M. P. 196.5–199.5° C. (corr.), $[\alpha]_D^{25} = +54.0°$ (1% in chloroform).

*Analysis.*—Calcd. for $C_{24}H_{36}O_5$: C, 71.25; H, 8.97. Found: C, 71.02; H, 8.80.

*Example 2*

3α - acetoxy - D - homopregnan - 17aα - ol - 11,20-dione [III; X is

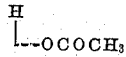

X' is O, R" is H] was prepared from 5.0 g. of 17aβ-ethynyl-D-homoetiocholan-3α,17aα-diol-11-one, M. P. 260.5–266° C., 2.5 g. of mercuric oxide, 20 ml. of acetic anhydride and 2 ml. of 47% boron trifluoride-ether complex according to the manipulative procedure described above in Example 1. The total crude product after hydrolysis and acetylation (5.5 g.) was boiled with 30 ml. of ethyl acetate and filtered, removing 0.5 g. of insoluble material. The filtrate was concentrated and the residue chromatographed as described above in Example 1. The desired material was eluated with an ether-petroleum ether (Skellysolve A) mixture containing 40% of ether, and was recrystallized successively from an ethyl acetate-petroleum ether (Skellysolve C) mixture, a minimum amount of ethanol, and twice from a benzene-petroleum ether (Skellysolve C) mixture, and dried at 110° C. in vacuo for seven hours, giving 3α-acetoxy-D-homopregnan-17aα-ol - 11,20 - dione, M. P. 210.5–212.5° C. (corr.), $[\alpha]_D^{24.3} = +31.1°$ (1% in chloroform).

*Analysis.*—Calcd. for $C_{24}H_{36}O_5$: C, 71.25; H, 8.97. Found: C, 71.47; H, 8.80.

*Example 3*

3α - acetoxy - D - homopregnan - 17a - ol - 11,20-dione [III; X is

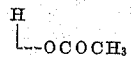

X' is O, R" is H].—3α-acetoxy-17aβ-ethynyl-D-homo-etiocholan-17aα-ol-11-one, M. P. 189–190.5° C. (11.60 g.), 300 ml. of glacial acetic acid, 65 ml. of acetic anhydride and 15.5 ml. of 47% boron trifluoride-ether complex were mixed and allowed to stand for one and one-half hours. Mercuric acetate (9.89 g.) was then mixed in, and the reaction mixture was allowed to stand for four days. Hydrogen sulfide was then passed through the mixture for one-half hour, and the mixture was allowed to stand for one-half hour and then filtered. The filtrate was concentrated in vacuo to a 30-40 ml. volume, 1.5 liters of water was added and the solid material was collected by filtration. The latter product was dissolved in 300 ml. of methanol containing 20 g. of potassium carbonate and 50 ml. of water, and the solution was refluxed for one and one-half hours. The solution was concentrated in vacuo, the solid material was collected by filtration, washed with water and dried at 70° C., giving 11.57 g. of D-homopregnane-3α,17aα-diol-11,20-dione. The latter was mixed with 40 ml. of acetic anhydride and 20 ml. of pyridine and the mixture was heated for one-half hour on a steam bath, and then added to 1.5 liters of water, kept for one hour, and the solid product collected by filtration. The 12.4 g. of material thus obtained was recrystallized from an ethyl acetate-petroleum ether (Skellysolve C) mixture, using activated charcoal for decolorizing purposes, and then recrystallized from methanol and dried at 70° C., giving 7.2 g. of 3α-acetoxy-D-homopregnan-17aα-ol-11,20-dione, M. P. 209–210° C. (uncorr.).

*Example 4*

(a) 3,17αβ - diacetoxy - 17aα - ethynyl - D - homoetiocholan-11-one [II; X is

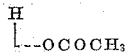

X' is O, R" is $CH_3CO$].—A mixture of 40.0 g. of 17aα-ethynyl-D-homoetiocholane-3α,17aβ-diol-11-one, 300 ml. of 90–95% acetic anhydride, 45 g. of p-toluenesulfonic acid monohydrate and 500 ml. of acetic acid was kept for four days at room temperature. The reaction mixture was then added to 12 liters of water, allowed to stand for 1.5 hours, and the solid product was collected by filtration, dried at 70° C., recrystallized first from an ethyl acetate-petroleum ether (Skellysolve C) mixture, then from methanol, and again from ethyl acetate-petroleum ether, giving 41.2 g. of 3α,17aβ-diacetoxy-17aα-ethynyl-D-homoetiocholan-11-one, M. P. 203–204° C., followed by resolidification and again melting at 215–216° C. A pure sample of the compound had the M. P. 205.5–207.5° C. with resolidification and remelting at 214.5–217.5° C. (corr.), $[\alpha]_D^{23.8}=+5.6°$ (1% in chloroform).

*Analysis.*—Calcd. for $C_{26}H_{36}O_5$: C, 72.86; H, 8.47. Found: C, 72.71; H, 8.19.

Similarly starting from 2.0 g. of 17aβ-ethynyl-D-homoetiocholane-3α,17aα-diol-11-one there was prepared the stereoisomeric 3α,17aα - diacetoxy - 17aβ - ethynyl - D - homoetiocholan-11-one, M. P. 204.5–205.5° C., $$[\alpha]_D^{24}=+69.9°$$

(1% in chloroform).

*Analysis.*—Calcd. for $C_{26}H_{36}O_5$: C, 72.86; H, 8.47. Found: C, 72.64; H, 8.34.

(b) D-homopregnane-3α,17aβ-diol-11,20-dione [III; X is

X' is O, R" is H].—A mixture of 37.43 g. of 3α,17aβ-diacetoxy-17aα-ethynyl-D-homoetiocholan-11-one, 52.1 g. of mercuric chloride, 11.16 ml. of aniline, 636 ml. of benzene and 187 ml. of water was refluxed with stirring for twenty-four hours. The reaction mixture was concentrated in vacuo to dryness and the residue was dissolved in 750 ml. of absolute ethanol. To the solution was added 15 ml. of concentrated ammonium hydroxide, and hydrogen sulfide gas was passed through at 70° C. for one-half hour. The mixture was filtered while warm and concentrated in vacuo to about 500 ml. To the solution was added 25 ml. of concentrated hydrochloric acid and 50 ml. of water and the solution was refluxed for two hours, allowed to stand for about fifteen hours, and then 50 ml. of 35% sodium hydroxide solution was added and the mixture refluxed for one and one-half hours. Water (150 ml.) was added, the ethanol was removed in vacuo, the residue diluted with water and the solid material (35.7 g.) collected by filtration and recrystallized from ethyl acetate, giving 26.0 g. of D-homopregnane-3α,17aβ-diol-11,20-dione, M. P. 224–225° C. (uncorr.).

In another experiment the intermediate 3α,17aβ-diacetoxy-D-homopregnane-11,20-dione [III; X is

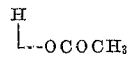

X' is O, R" is $CH_3CO$] was isolated, M. P. 167–168.5° C. (corr.), $[\alpha]_D^{23.7}=+20.6°$ (1% in chloroform) when recrystallized from methanol.

*Analysis.*—Calcd. for $C_{26}H_{38}O_6$: C, 69.93; H, 8.58. Found: C, 69.72; H, 8.80.

*Example 5*

(a) 21,21 - dibromo - 3α,17aβ - diacetoxy-D-homopregnane-11,20-dione.—A solution was prepared from 4.286 g. of 3α,17aβ-diacetoxy-17aα-ethynyl-D-homoetiocholan-11-one in 200 ml. of tertiary-butyl alcohol containing 10 ml. of glacial acetic acid. A second solution was prepared from 5.12 g. of 97% N-bromoacetamide and 5.14 g. of sodium acetate trihydrate in 50 ml. of water. The two solutions were then mixed and allowed to stand at room temperature (28° C.) for nineteen hours. The reaction mixture was concentrated in vacuo to a 50 ml. volume, diluted to 50 ml. with water, and the solid material which formed was collected by filtration and dried at 70° C., giving 5.749 g. of 21,21-dibromo-3α,17aβ-diacetoxy-D-homopregnane-11,20-dione, M. P. 177–188° C.

(b) 3α,17aβ-diacetoxy-D-homopregnane-11,20-dione.— A mixture of 3.00 g. of 21,21-dibromo-3α,17aβ-diacetoxy-D-homopregnane-11,20-dione, obtained as described above in part (a), 5 g. of zinc dust, 5 g. of sodium acetate trihydrate and 40 ml. of acetic acid was heated to 80° C., shaken vigorously for fifteen minutes and filtered while warm. The residual zinc was washed with acetic acid, the washings combined with the filtrate, and the filtrate diluted to 800 ml. with water. The solid product was collected by filtration and dried at 70° C., giving 2.28 g. of 3α,17aβ-diacetoxy-D-homopregnane-11,20-dione, M. P. 154–157° C.

*Example 6*

D-homopregnane-3α,17aα-diol-11,20-dione [III; X is

X' is O, R" is H] was prepared by hydrolysis of the corresponding 3-acetate (Examples 2 and 3) by heating with a dilute methanolic solution of potassium carbonate. The methanol was removed in vacuo, the residue diluted with water, and the solid material was collected by filtration, dried, recrystallized first from an ethyl acetate-petroleum ether (Skellysolve C) mixture and then from ethyl acetate and dried at 110° C. in vacuo for eight hours, giving D-homopregnane-3α,17aα-diol-11,20-dione, M. P. 184–186° C. (corr.), $[\alpha]_D^{25}=0°$ (1% in chloroform).

*Analysis.*—Calcd. for $C_{22}H_{34}O_4$: C, 72.89; H, 9.45. Found: C, 72.95; H, 9.55.

*Example 7*

D-homopregnane-3α,17aβ-diol-11,20-dione [III; X is

X' is O, R" is H] was prepared from the corresponding 3-acetate (Example 1) or the 3,17a-diacetate (Example 4) by heating with a dilute methanolic solution of potassium carbonate. The methanol was removed in vacuo, the residue diluted with water, and the solid which separated was collected by filtration, recrystallized from ethyl acetate and dried at 110° C. in vacuo for eight hours, giving D-homopregnane-3α,17aβ-diol-11,20-dione, M. P. 225–226.5° C. (corr.), $[\alpha]_D^{25}=+28.2°$ (1% in chloroform).

Analysis.—Calcd. for $C_{22}H_{34}O_4$: C, 72.89; H, 9.45. Found: C, 72.85; H, 9.69.

D-homopregnane-3α,17aβ-diol-11,20-dione was found to possess progesterone antagonizing properties determined as follows: female rats seven days pregnant were castrated and given a standard dose of progesterone. Varying doses of the new compound were injected and the size of the embryos and placentas subsequently measured. The retarded development of the latter as compared with those of control animals was indicative of progesterone-antagonizing properties in the new compound.

3α-propionoxy - D - homopregnan-17aβ-ol-11,20-dione, 3α-hexanoyloxy-D-homopregnan-17aβ-ol-11,20-dione, 3α-trimethylacetoxy - D - homopregnan-17aβ-ol-11,20-dione, 3α-(β-carboxypropionoxy)-D-homopregnan-17aβ-ol-11,20-dione, 3α - benzoyloxy-D-homopregnan-17aβ-ol-11,20-dione, and 3α-(β-cyclopentylpropionoxy)-D-homopregnan-17aβ-ol-11,20-dione can be prepared by reacting D-homopregnane-3α,17aβ-diol-11,20-dione with propionic anhydride, caproyl chloride, trimethylacetyl chloride, succinic anhydride, benzoyl chloride, and β-cyclopentylpropionyl chloride, respectively, in the presence of pyridine. 3α-formoxy-D-homopregnan-17aβ-ol-11,20-dione can be prepared by reacting D-homopregnane-3α,17aβ-diol-11,20-dione with formic acid in the presence of acetic anhydride. The 17a-hydroxy group can also be acylated under forcing conditions, for example, in the presence of p-toluenesulfonic acid.

*Example 8*

D-homopregnan-17aβ-ol-3,11,20-trione [III; X and X′ are O, R″ is H].—About 3.3 g. of D-homopregnane-3α,17aα-diol-11,20-dione in 25 ml. of acetone was cooled to 5° C., and 4 ml. of water and 2 g. of N-bromoacetamide were added. The mixture was kept at 5° C. for four hours, then poured into 500 ml. of water, mixed well, and the solid material was collected by filtration and dried at 50° C. giving 1.0 g., M. P. 196–199° C. The latter was recrystallized twice from an ethyl acetate-petroleum ether (Skellysolve C) mixture and dried at 120° C. in vacuo for eight hours, giving D-homopregnan-17aα-ol-3,11,20-trione, M. P. 210.5–212° C. (corr.), $[\alpha]_D^{24}=+10.1°$ (1% in chloroform).

Analysis.—Calcd. for $C_{22}H_{32}O_4$: C, 73.30; H, 8.95. Found: C, 73.56; H, 8.82.

*Example 9*

D-homopregnan-17aβ-ol-3,11,20-trione [III; X and X′ are O, R″ is H].—Chromic oxide (8.0 g.) was added in four portions to 100 ml. of pyridine with stirring at 10° C. The solution was stirred for ten minutes at 10° C. and then for an additional ten minutes at room temperature. There was then added 8.757 g. of D-homopregnane-3α,17aβ-diol-11,20-dione dissolved in 70 ml. of pyridine, and the mixture was stirred for one and one-half hours at room temperature and allowed to stand for about fifteen hours. The reaction mixture was then diluted with water and then extracted with a 1:1 ether-ethyl acetate mixture. The extracts were washed with dilute sulfuric acid and dilute sodium bicarbonate solution, dried over anhydrous sodium sulfate and concentrated. The residue, 8.36 g., M. P. 173–178° C., was recrystallized first from an ethyl acetate-petroleum ether (Skellysolve C) mixture and then from ethyl acetate and dried at 110° C. in vacuo for eight hours, giving D-homopregnan-17aβ-ol-3,11,20-trione, M. P. 179.5–180° C. (corr.), $[\alpha]_D^{25}=+36.5°$ (1% in chloroform).

Analysis.—Calcd. for $C_{22}H_{32}O_4$: C, 73.30; H, 8.95. Found: C, 73.39; H, 8.99.

D-homopregnan-17aβ-ol-3,11,20-trione was found to possess progesterone antagonizing properties as determined by the method described in Example 7.

*Example 10*

3α-acetoxy-D-homo - 17(17a) - pregnene - 11,20 - dione [IV, X is

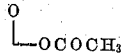

X′ is O].—3α-acetoxy-17α-ethynyl-D-homoetiocholan-17aβ-ol-11-one (5.0 g.) was dissolved in 175 ml. of ethylene glycol by heating. Mercuric acetate (2.5 g.) was then added, the mixture was cooled to room temperature, 5.0 ml. of 47% boron trifluoride-ether complex was added, and the mixture was kept at room temperature for eighteen hours. Glacial acetic acid (150 ml.) was then added, and the mixture was stirred for eight hours at room temperature and heated on a steam bath for five hours. The reaction mixture was added to two liters of water, extracted twice with methylene dichloride, and the extracts were washed with water and sodium bicarbonate solution and concentrated. The residue was refluxed with 50 g. of potassium carbonate in 400 ml. of methanol and 100 ml. of water for one and one-half hours. The methanol was removed in vacuo, the residue diluted to 700 ml. with water, and the solid material was collected by filtration and dried at 70° C., giving 4.2 g. of D-homo-17(17a)-pregnen-3α-ol-11,20-dione. The latter was acetylated with 30 ml. of acetic anhydride and 20 ml. of pyridine by heating for forty-five minutes on a steam bath. The reaction mixture was added to 800 ml. of ice-water, the product was extracted with methylene dichloride, and the extracts were washed with dilute hydrochloric acid and sodium bicarbonate solution, dried over anhydrous sodium sulfate and concentrated. The product was dissolved in 80 ml. of ether and 720 ml. of petroleum ether (Skellysolve A) and chromatographed on a column of 250 g. of silicon dioxide. The column was eluted with ether-petroleum ether mixtures containing gradually increasing amounts of ether. The material eluted with 40% ether (2.0 g., M. P. 173–185° C.) was recrystallized successively from methanol, ethyl acetate-petroleum ether (Skellysolve C), benzene-petroleum ether (Skellysolve B), and ethyl acetate, and dried at 110° C. in vacuo for eight hours, giving 3α-acetoxy-D-homo-17(17a)-pregnene-11,20-dione, M. P. 191–193.5° C. (corr.), $[\alpha]_D^{24.3}=+149.8°$ (1% in chloroform).

Analysis.—Calcd. for $C_{24}H_{34}O_4$: C, 74.56; H, 8.87. Found: C, 74.64; H, 8.75.

*Example 11*

D-homo-17,17a-pregnen-3α-ol-11,20-dione [IV, X is

X′ is O] was prepared from the corresponding 3-acetate, M. P. 182–185° C. (Example 10) by refluxing with potassium carbonate in dilute methanol solution. The product thus obtained was recrystallized first from dilute methanol and then from ethyl acetate and dried at 120° C. in vacuo for eight hours, giving D-homo-17,17a-pregnen-3α-ol-11,20-dione, M. P. 207–212° C. (corr.), $$[\alpha]_D^{24}=+141.3°$$

(1% in chloroform).

Analysis.—Calcd. for $C_{22}H_{32}O_3$: C, 76.70; H, 9.36. Found: C, 76.40; H, 9.63.

*Example 12*

3α-acetoxy-D-homopregnane-11,20-dione [V; X is

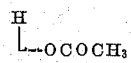

X′ is O] 3α-acetoxy-D-homo-17,17a-pregnene-11,20-dione (2.545 g., M. P. 183–186° C.) in 200 ml. of absolute ethanol was hydrogenated in the presence of 1.00 g. of 22% palladium hydroxide-on-strontium carbonate catalyst at room temperature and 40 lbs. per sq. inch pressure. Reduction was complete in about twenty-five minutes and the reaction mixture was filtered and concentrated. The residue (2.50 g., M. P. 169–180° C.) was recrystallized successively from an ethyl acetate-petroleum ether (Skellysolve C) mixture, methanol and acetone, giving 3α-acetoxy-D-homopregnane-11,20-dione, M. P. 192.5–193.5° C. (corr.), $[\alpha]_D^{25} = +92.4°$ (1% in chloroform).

Analysis.—Calcd. for $C_{24}H_{36}O_4$: C, 74.19; H, 9.34. Found: C, 73.80; H, 9.28.

Example 13

3α-acetoxy-D-homopregnane-17aβ,20-diol-11-one [VII; R'' is $CH_3CO$, X' is O].—To a solution of 3.252 g. of 3β-acetoxy-D-homopregnan-17aβ-ol-11,20-dione [VI; R'' is $CH_3CO$, X' is O] (Example 1) in 100 ml. of methanol at 20° C. was added 0.304 g. of sodium borohydride in 4 ml. of water. After one and one-half hours at room temperature, 3 ml. of acetic acid was slowly added and the methanol was removed in vacuo. The residue was diluted with water and the solid product was collected by filtration and dried, giving 3.172 g., M. P. 257–264° C. The latter was recrystallized first from ethyl acetate and then from methanol and dried at 115° C. in vacuo for eight hours, giving 3α-acetoxy-D-homopregnane-17aβ,20-diol-11-one, M P. 262–273.5° C. (corr.), $[\alpha]_D^{24} = +36.1°$ (1% in chloroform).

Analysis.—Calcd. for $C_{24}H_{38}O_5$: C, 70.90; H, 9.42. Found: C, 71.00; H, 9.35.

If in the above procedure sodium borohydride is replaced by two equivalents of lithium aluminum hydride, there can be obtained 3α-acetoxy-D-homopregnane-11β,-17aβ,20-triol $$\left[ \text{VII; R'' is } CH_3CO, \text{ X' is } \underset{\text{---OH}}{H} \right]$$

Example 14

D-homopregnane-3α,11β,17aβ,20-tetrol $$\left[ \text{VII; R'' is H, X' is } \underset{\text{---OH}}{H} \right]$$

A mixture of 364 mg. of 3α-acetoxy-D-homopregnane-17aβ,20-diol-11-one (Example 13), 350 mg. of sodium borohydride, and 4 ml. of 35% aqueous sodium hydroxide solution in 50 ml. of methanol was refluxed for 18 hours. The volatile material was removed in vacuo, the residue stirred with water, and the solid product was collected by filtration, washed with water and dried at 70° C. After two recrystallizations from methanol and drying on a vacuum oven at 110° C. for eight hours, there was obtained D-homopregnane-3α,11β,17aβ,20-tetrol, M. P. 203–208° C. (corr.).

Analysis.—Calcd. for $C_{22}H_{38}O_4$: C, 72.09; H, 10.45. Found: C, 72.26; H, 10.38.

Example 15

D-homopregnane-3α,17aβ,20-triol-11-one [VII; R'' is H, X' is O] was prepared from 7.172 g. of D-homopregnane-3α,17aβ-diol-11,20-dione (Example 7) and 3.755 g. of sodium borohydride according to the manipulative procedure described above in Example 13. The crude product (7.163 g., M. P. 185–188° C.) was recrystallized first from ethanol and then from ethyl acetate and dried at 120° C. in vacuo for eight hours, giving D-homopregnane-3α,17aβ,20-triol-11-one, M. P. 201.5–207.5° C. (corr.), $[\alpha]_D^{24} = +14.4°$ (1% in chloroform).

Analysis.—Calcd. for $C_{22}H_{36}O_4$: C, 72.49; H, 9.96. Found: C, 72.80; H, 10.22.

D-homopregnane-3α,17aβ,20-triol-11-one was found to have progresterone antagonizing properties as determined by the method described in Example 7.

Example 16

3α,20-diacetoxy-D-homopregnan-17aβ-ol-11-one.—The combined mother liquors from the recrystallization of the products described above in Examples 13 and 15 were concentrated in vacuo. The residue was dissolved in acetone and again concentrated to remove residual methanol. The residue was heated with 50 ml. of acetic anhydride and 30 ml. of pyridine for one hour on a steam bath. The reaction mixture was poured into 850 ml. of water, and after one hour the solid material was collected by filtration, recrystallized first from an ethyl acetate-petroleum ether (Skellysolve C) mixture and then from methanol and dried at 120° C. in vacuo for eight hours, giving 3α,20-diacetoxy-D-homopregnan-17aβ-ol-11-one, M. P. 190.5–192.5° C. (corr.), $[\alpha]^{255.5} = +16.9°$ (1% in chloroform).

Analysis.—Calcd. for $C_{26}H_{40}O_6$: C, 69.61; H, 8.99. Found: C, 69.63; H, 8.83.

Example 17

3α-acetoxy-D-homopregnane-11,20-dione [V; X is

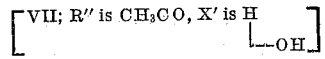

X' is O].—A mixture of 3.30 g. of 3α,20-diacetoxy-D-homopregnan-17aβ-ol-11-one (Example 16) and 75 g. of zinc dust was heated in refluxing p-cymene (B. P. 174–175° C.) with stirring for 42 hours. The reaction mixture was cooled and filtered, the zinc pad was washed through with ethyl acetate and the washings combined with the filtrate. The filtrate was steam distilled until no more oil (p-cymene) appeared in the distillate. The undistilled fraction was extracted with ethyl acetate, and the extracts were dried over anhydrous sodium sulfate and concentrated. The residue (3.09 g.) was dissolved in n-pentane containing 10% of ether and the solution was chromatographed on a column of 150 g. of silicon dioxide. The column was eluted with ether-n-pentane mixtures of gradually increasing ether content. The material brought out by 60% ether was recrystallized from an ethyl acetate-petroleum ether (Skellysolve C) mixture and the recrystallized material washed with n-hexane. The product thus obtained was recrystallized from a small volume of methanol and dried at 70°, giving 3α-acetoxy-D-homopregnane-11,20-dione, M. P. 191.5–192.5° C. It showed no depression in melting point when mixed with a sample of the product obtained in Example 12, M. P. 192.5–193.5° C. A mixture of the product with the starting material, M. P. 190.5–192.5° C. had a sharply depressed melting point, 158–171° C.

Example 18

21-bromo - D - homopregnane-3α,17aβ-diol-11,20-dione [IX; R'' is H, X' is O, R is OH, Hal is Br]. A solution of 23.56 g. of D-homopregnane-3α,17aβ-diol-11,20-dione in 250 ml. of glacial acetic acid was warmed to 35° C., and 1 ml. of a solution of 3.75 ml. of bromine in 50 ml. of acetic acid was added. The solution was stirred until the bromine color faded, then the rest of the bromine solution was added dropwise rather rapidly over a period of one hour and fifteen minutes. The reaction mixture was stirred for ten minutes longer, diluted to 3.5 liters with water, and the solid product was collected by filtration and dried. The latter was recrystallized twice from 50 ml. of methanol and then from an equal volume mixture of ethyl acetate and petroleum ether (Skellysolve C) and dried at 60° C. in vacuo for eight hours, giving 21-bromo-D-homopregnane-3α,17aβ-diol-11,20-dione, M. P. 200–202.5° C. (dec.) (corr.), $[\alpha]_D^{25} = +25.7°$ (1% in chloroform).

Analysis.—Calcd. for $C_{22}H_{33}BrO_4$: C, 59.86; H, 7.54; Br, 18.11. Found: C, 59.60; H, 7.35; Br, 18.28.

Example 19

(a) 21-bromo-D-homopregnane-3α,17aβ - diol - 11,20- dione [IX; R" is H, X' is O, R is OH, Hal is Br] was prepared from 4.24 g. of D-homopregnane-3α,17aβ-diol-11,20-dione and 56 ml. of 0.2205 M bromine in chloroform according to the manipulative procedure described above in Example 18 except that 100 ml. of chloroform was used as the solvent instead of acetic acid. The reaction mixture was washed with sodium bicarbonate solution, dried over anhydrous sodium sulfate and concentrated. The residue was recrystallized from acetone giving 4.157 g. of 21-bromo-D-homopregnane-3α,17aβ-diol-11,20-dione.

(b) *21-bromo-D-homopregnan-17aβ-ol-3,11,20 - trione* [X; X' is O, R is OH, Hal is Br].—The 21-bromo-D-homopregnane-3α,17aβ-diol-11,20-dione obtained above in part (a) was dissolved in 250 ml. of tertiarybutyl alcohol, cooled to 10° C., and 5 ml. of methanol and 0.8 ml. of 30% hydrogen bromide in acetic acid were added. To this solution there was added 2.2 g. of N-bromoacetamide, and the reaction mixture was mixed well and allowed to stand at 5–8° C. for five hours. The reaction mixture was diluted with water, extracted with methylene dichloride, and the extracts were washed with water and with sodium bicarbonate solution, dried over sodium sulfate and concentrated. There was thus obtained 21-bromo-D-homopregnan-17aβ-ol-3,11,20-trione, M. P. 237–238° C. (dec.) (uncorr.) when immersed at 220° C.

Example 20

*21-acetoxy-D-homopregnan-17aβ - ol - 3,11,20-trione* [XI; X' is O, R is OH, R" is $COCH_3$].—A mixture of the 21-bromo-D-homopregnan-17aβ-ol-3,11,20-trione obtained above in Example 19, 8.0 g. of potassium bicarbonate, 4.8 ml. of glacial acetic acid and 120 ml. of acetone was refluxed and stirred for twenty-three hours. The reaction mixture was diluted with water, the acetone was removed in vacuo, the residual aqueous mixture was extracted with methylene dichloroide, and the extracts washed with water, dried over anhydrous sodium sulfate and concentrated. The residue was dissolved in 800 ml. of n-pentane containing 10% of ether and chromatographed on a column of 300 g. of silicon dioxide. The column was eluted with ether-n-pentane mixtures containing increasing proportions of ether. 100% ether brought out the crystalline product, M. P. 182–184° C. The latter was recrystallized first from a 1:3 ethyl acetate-petroleum ether (Skellysolve B) mixture and then from dilute methanol and dried at 70° C., giving 1.3 g. of 21-acetoxy-D-homopregnan-17aβ-ol-3,11,20-trione, M. P. 191–193° C. A sample when recrystallized from dilute methanol and dried at 110° C. in vacuo for eight hours had the M. P. 193.5–196° C. (corr.), $[\alpha]_D^{25}=+1.3°$ (1% in chloroform),

*Analysis.*—Calcd. for $C_{24}H_{34}O_6$: C, 68.87; H, 8.19. Found: C, 68.60; H, 8.45.

Example 21

(a) *21-bromo-D-homopregnane-3α,17aα-diol-11,20-dione* [IX; R" is H, X' is O, R is OH, Hal is Br] was prepared from 5.82 g. of D-homopregnane-3α,17aα-diol-11,20-dione and 77 ml. of 0.2205 M bromine in chloroform according to the manipulative procedure described above in Example 19, part (a). The product was used in the next step without purification.

(b) *21-bromo-D-homopregnan-17aα-ol-3,11,20-trione* [X; X' is O, R is OH, Hal is Br] was prepared from the crude 21-bromo-D-homopregnane-3α,17aα-diol-11,20-dione, obtained above in part (a), and 2.34 g. of N-bromoacetamide according to the manipulative procedure described above in Example 19, part (b). The crude product was used in the next step without purification.

(c) *21-acetoxy-D-homopregnan-17aα-ol-3,11,20-trione* [XI; X' is O, R is OH, R" is $COCH_3$] was prepared from the crude 21-bromo-D-homopregnan-17aα-ol-3,11,20-trione, obtained above in part (b), 8 g. of potassium bicarbonate, 4.8 ml. of glacial acetic acid and 115 ml. of acetone according to the manipulative procedure described above in Example 20. The crude product was dissolved in n-pentane solution containing 10% ether and chromatographed on a column of 400 g. of silicon dioxide. The material eluted with 100% ether was collected and recrystallized from methanol, giving 1.8 g. of 21-acetoxy-D-homopregnan-17aα-ol-3,11,20-trione, M. P. 193–195° C. A sample when recrystallized from ethyl acetate, dried at room temperature in vacuo for eight hours and then at 110° C. in vacuo for eight hours had the M. P. 199–201.5° C. (corr.), with resolidification at 205° C. and remelting at 223° C. (corr.), $[\alpha]_D^{25}=+63.8°$ (1% in chloroform).

*Analysis.*—Calcd. for $C_{24}H_{34}O_6$: C, 68.87; H, 8.19. Found: C, 68.60; H, 8.38.

Example 22

*4 - bromo - D - homopregnan-17aβ-ol-3,11,20-trione.*— A solution was prepared from 19.385 g. of D-homopregnan-17aβ-ol-3,11,20-trione in 200 ml. of glacial acetic acid containing four drops of 35% hydrogen bromide in acetic acid. A second solution was prepared from 19.90 g. of pyridinium bromide perbromide and 7.21 g. of sodium acetate trihydrate in 125 ml. of glacial acetic acid. The second solution was added dropwise to the first solution. After addition was complete, the reaction mixture was diluted with water, extracted three times with methylene dichloride, and the extracts were washed with water and sodium carbonate solution, dried over anhydrous sodium sulfate, concentrated to a 150 ml. volume and diluted with 150 ml. of absolute ether. After cooling in ice, the crystalline product precipitated and was collected by filtration and recrystallized by dissolving in acetone, concentrating and adding ether. There was thus obtained 18.22 g. of 4-bromo-D-homopregnan-17aβ-ol-3,11,20-trione, M. P. 200–206° C. (dec.) when immersed at 195° C. A sample when recrystallized from acetone had $[\alpha]_D^{25}=+71.4°$ (1% in chloroform).

*Analysis.*—Calcd. for $C_{22}H_{31}BrO_4$: C, 60.13; H, 7.11; Br. 18.19. Found: C, 60.40; H, 7.28; Br, 18.10.

Example 23

*D - homo - 4 - pregnan - 17aβ - ol - 3,11,20 - trione.*— 4 - bromo - D - homopregnan - 17aβ - ol - 3,11,20 - trione (15.97 g.) was dissolved in 160 ml. of freshly distilled dimethylformamide, and dry nitrogen gas was passed over the surface with stirring for fifteen minutes. Anhydrous lithium chloride (4.64 g.) was then added, and the mixture was heated for two hours at 98° C. with stirring. The reaction mixture was cooled, diluted to two liters with ice-water, mixed well, and the solid product was collected by filtration, giving 11.04 g., M. P. 171–201° C. The latter was recrystallized first from acetone and then twice from ethyl acetate, giving D-homo-4-pregnen-17aβ-ol-3,11,20-trione, M. P. 221–226.5° C. (corr.), $[\alpha]_D^{25}=+172.2°$ (1% in chloroform).

*Analysis.*—Calcd. for $C_{22}H_{30}O_4$: C, 73.71; H, 8.44. Found: C, 73.46; H, 8.62.

D-homo-4-pregnen-17aβ-ol-3,11,20-trione was found to have testosterone antagonizing properties, determined by measuring the counteracting influence upon the effect of testosterone on the seminal vesicle in the rat.

Example 24

*21 - acetoxy - D-homopregnane-3α,17aβ-diol-11,20-dione.*—A mixture of 4.41 g. of 21-bromo-D-homopregnane-3α,17aβ-diol-11,20-dione, 5.0 g. of potassium bicarbonate, 3.0 ml. of glacial acetic acid, 70 ml. of acetone and 0.05 g. of sodium iodide was refluxed with stirring for nineteen hours. The reaction mixture was diluted with water, the acetone was removed in vacuo, the residual aqueous mixture was extracted with chloroform, and the extracts were washed with water, dried over anhydrous sodium sulfate and concentrated. The residue was dissolved in acetone, the solution was filtered, the filtrate concentrated to a small volume and the product induced to crystallize by adding n-heptane. The product was recrystallized twice from an ethyl acetate-petroleum ether (Skellysolve C) mixture, giving 21-acetoxy-D-homopregnane-3α,17aβ-diol-11,20-dione, M. P. 207–209° C. (uncorr.).

*Example 25*

(a) *4-bromo-21-acetoxy-D-homopregnan-17aβ-ol-3,11, 20-trione* [XII; Hal is Br, X' is O, R is OH, R" is $COCH_3$].—21 - acetoxy - D - homopregnan-17aβ-ol-3,11, 20-trione (1.076 g.) was dissolved in 15 ml. of glacial acetic acid containing two drops of hydrogen bromide in acetic acid. To this solution there was added dropwise with stirring a solution of 975 mg. of pyridinium bromide perbromide and 340 mg. of sodium acetate trihydrate in 10 ml. of glacial acetic acid. The addition was carried out at such a rate that each drop was allowed to decolorize before adding the next. The reaction mixture was then stirred for five minutes, diluted with water and extracted with methylene dichloride. The methylene dichloride extracts were washed with water and sodium bicarbonate, dried over anhydrous sodium sulfonate and concentrated. The crude 4-bromo-21-acetoxy-D-homopregnan-17aβ-ol-3-11,20-trione thus obtained was used directly in the next step.

(b) *21-acetoxy-D-homo-4-pregnen-17aβ-ol-3,11,20-trione* [XIII; X' is O, R is OH, R" is $COCH_3$].—The crude 4 - bromo - 21 - acetoxy-17aβ-ol-3,11,20-trione obtained above in part (a) was treated with 326 mg. of anhydrous lithium chloride in 25 ml. of freshly distilled dimethylformamide according to the manipulative procedure described above in Example 23. The crude product was extracted with methylene dichloride, and the extracts were concentrated, giving about 1 g. of 21-acetoxy-D-homo-4-pregnen-17aβ-ol-3,11,20-trione.

By an analogous procedure, 21-acetoxy-D-homopregnan-17aα-ol-3,11,20-trione can be converted to 21-acetoxy-D-homo-4-pregnen-17aα-ol-3,11,20-trione.

I claim:

1. A compound selected from the group consisting of: (A) compounds of the etiocholane series having the formula

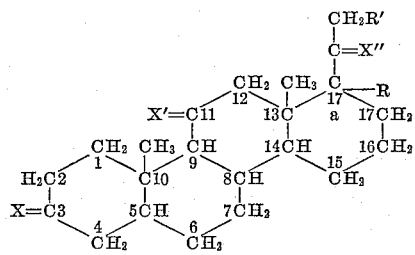

wherein X=, X'= and X" are selected from the class consisting of

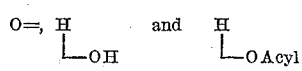

R is selected from the class consisting of H, OH and OAcyl, and R' is selected from the class consisting of H, OH, OAcyl, chlorine, bromine and iodine, Acyl in all cases being selected from the group consisting of lower-alkanoyl, carboxy-lower-alkanoyl and monocarbocyclic aroyl groups; (B) compounds of the etiocholane series of the above formula in which a hydrogen atom at position 17 and the group R at position 17a are eliminated thus having a double bond in the 17,17a-position; and (C) compounds of the etiocholane series of the above formula having a halogen atom selected from the group consisting of chlorine, bromine and iodine in place of one of the hydrogen atoms at position 4, X being O.

2. A compound of the etiocholane series having the formula

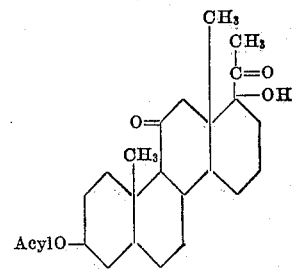

wherein Acyl is a member of the group consisting of lower-alkanoyl, carboxy-lower-alkanoyl and monocarbocyclic aroyl groups.

3. A compound of the etiocholane series having the formula

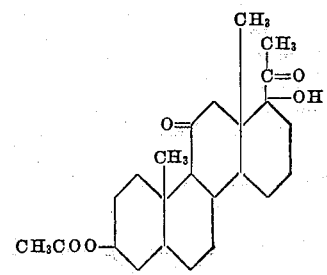

4. A compound of the etiocholane series having the formula

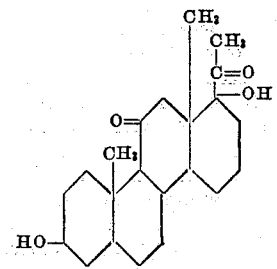

5. A compound of the etiocholane series having the formula

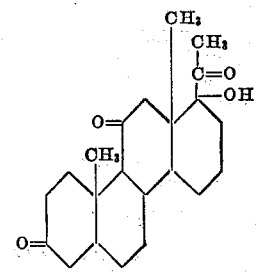

6. A compound of the etiocholane series having the formula

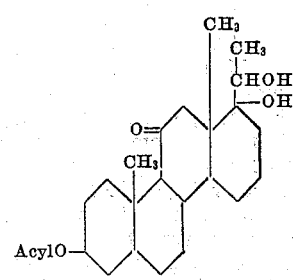

wherein Acyl is a member of the group consisting of lower-alkanoyl, carboxy-lower-alkanoyl and monocarbocyclic aroyl groups.

7. A compound of the etiocholane series having the formula

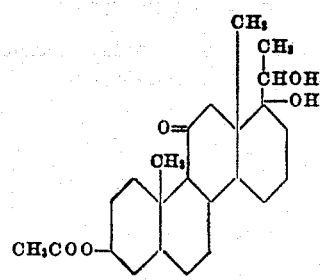

8. A compound of the etiocholane series having the formula

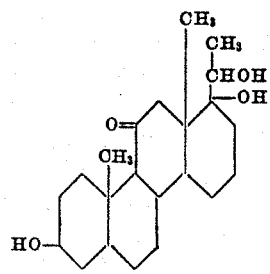

9. A compound of the etiocholane series having the formula

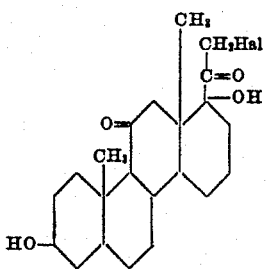

wherein Hal is a member of the group consisting of chlorine, bromine and iodine.

10. A compound of the etiocholane series having the formula

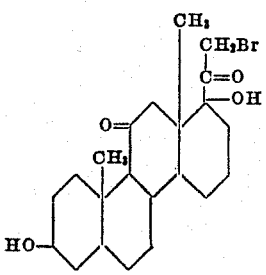

11. A compound of the etiocholane series having the formula

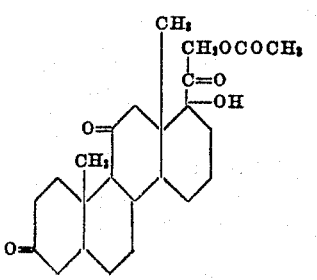

12. A compound of the etiocholane series having the formula

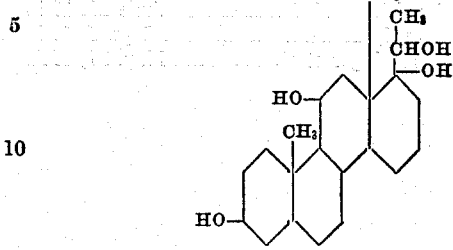

13. A compound of the etiocholane series having the formula

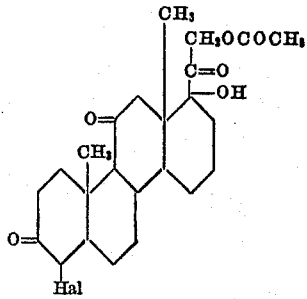

wherein Hal is a halogen atom selected from the group consisting of chlorine, bromine and iodine.

14. A compound of the etiocholane series having the formula

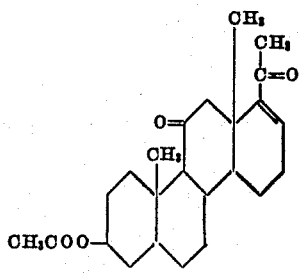

15. A compound of the etiocholane series having the formula

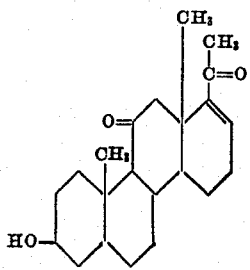

16. A compound of the etiocholane series having the formula

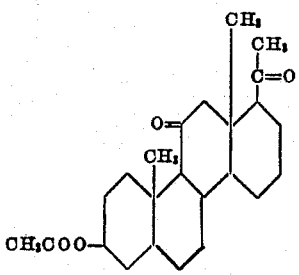

(References on following page)

References Cited in the file of this patent

UNITED STATES PATENTS

| | | |
|---|---|---|
| 2,351,637 | Ruzicka et al. | June 20, 1944 |
| 2,357,364 | Stavely | Sept. 5, 1944 |
| 2,576,311 | Schlesinger et al. | Nov. 27, 1951 |
| 2,732,405 | Dodson et al. | Jan. 24, 1956 |

OTHER REFERENCES

Fieser et al.: "Natural Products Related to Phenanthrene;" 3rd ed. (1949), page 262.

UNITED STATES PATENT OFFICE
Certificate of Correction

Patent No. 2,860,158                          November 11, 1958

Raymond O. Clinton

It is hereby certified that error appears in the printed specification of the above numbered patent requiring correction and that the said Letters Patent should read as corrected below.

Column 6, line 48, for "eluated" read —eluted—; column 7, line 24, for "3,17αβ-" read —3α,17αβ- —; column 10, line 10, for "17α-ethynyl-" read —17aα-ethynyl- —; column 11, line 18, for "3β-acetoxy-" read — 3α-acetoxy- —; line 74, for "progresterone" read —progesterone—; column 12, line 15, for "$[\alpha]^{255.5}$" read —$[\alpha]_D^{25.5}$—; line 41, for "60%" read —50%—; column 14, line 44, for "4-pregnan-" read — 4-pregnen- —.

Signed and sealed this 7th day of April 1959.

[SEAL]

Attest:
KARL H. AXLINE,
*Attesting Officer.*

ROBERT C. WATSON,
*Commissioner of Patents.*